Sept. 28, 1971 A. H. YOUMANS 3,608,373
METHOD AND WELL LOGGING APPARATUS HAVING ACOUSTIC
AND NEUTRON PADS
Filed Nov. 4, 1968 2 Sheets-Sheet 1
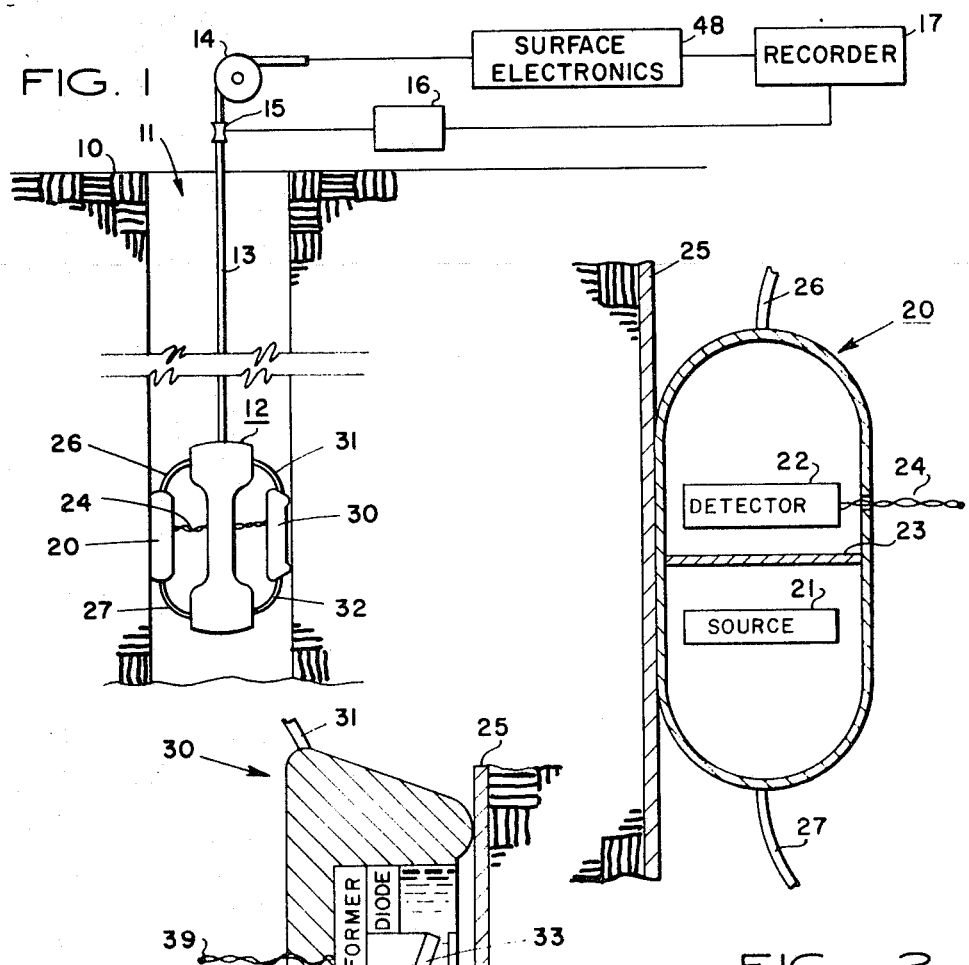
INVENTOR
ARTHUR H. YOUMANS
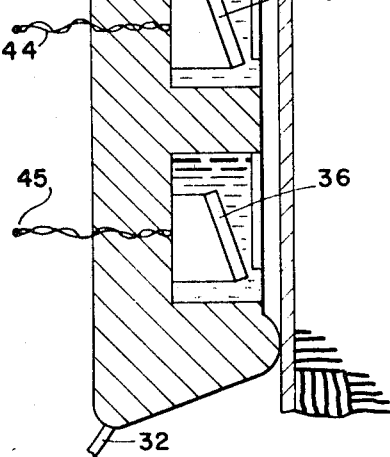
ATTORNEY United States Patent Office 3,608,373
Patented Sept. 28, 1971

3,608,373
METHOD AND WELL LOGGING APPARATUS HAVING ACOUSTIC AND NEUTRON PADS
Arthur H. Youmans, Houston, Tex., assignor to Dresser Industries, Inc., Dallas, Tex.
Filed Nov. 4, 1968, Ser. No. 772,894
Int. Cl. E21b 49/00
U.S. Cl. 73—152                                    6 Claims

ABSTRACT OF THE DISCLOSURE

A well logging instrument adapted for traversing an earth borehole has a neutron pad member on one side of the instrument which is normally spring-forced into contact with the borehole wall during such a traversal. The instrument has on its opposite side an acoutic pad which is also normally spring-forced into contact with the borehole wall during such a traversal.

The acoustic pad has an acoustic transmitting transducer and a pair of acoustic receiving transducers for producing an acoustic time interval measurement. Each transducer is mounted on an acute angle from the longitudinal axis of the elongated instrument housing and is mounted in a fluid medium chosen to match the acute angle so that a steep rising wave front passes through the formation surrounding the borehole and produces a steep rising signal at the respective receivers, thereby permitting an accurate measurement of acoustic wave travel time from transmitter to first receiver and from first to second receiver.

The neutron pad, having a capsuled neutron source and an epithermal neutron detector, responds to variations in formation porosity and to the thickness and constituency of mud and mud cake intervening between the pad and the formation. The acoustic pad serves to indicate the extent of the effect on the neutron-derived porosity measurement due to the mud and mud cake and permits a corrected porosity to be derived and recorded.

BACKGROUND OF THE INVENTION

This invention relates to well logging systems in general, and more particularly, to well logging method and apparatus having in combination therewith means for neutron logging including acoustic means for improving the accuracy of the neutron log. Neutron logging systems of the prior art have been plagued by the fact that the neutron log response is seriously affected by the thickness, chemical content and density of the mud and mud cake between the borehole instrument and the formation of interest. It is often impossible to eliminate this cause of error in the neutron log because the walls of boreholes to be logged are frequently rough and irregular due to erosion so that a logging instrument cannot contact the wall uniformly along its length. Additionally, the mud cake is frequently compacted to such a degree that an instrument cannot be caused to cut through it to contact the wall but rather the instrument slides along substantially on top of the layer of mud cake.

It is therefore the primary object of this invention to provide a neutron well logging apparatus having improved means for mud and mud cake compensation;

It is another object of the invention to provide a new and improved method of correcting a neutron porsity measurement for mud and mud cake standoff in a borehole.

The objects of the invention are accomplished, broadly, by the provision of a well logging apparatus having both an acoustic pad member and a neutron pad member mounted on the instrument. The acoustic pad member has a plurality of acoustic transducers mounted at selected angles in a fluid medium having predetermined velocity characteristics to provide optimized reinforcement of the acoustic signals returning from the formations surrounding the borehole. The neutron log produced by the neutron pad member receives compensation for the effects of mud cake and mud from the acoustic pad member and its associated electronic circuitry.

These and other objects, features and advantages of the present invention will become more apparent from a reading of the following detailed description and drawing in which:

FIG. 1 illustrates schematically a side elevation partly in cross section, of a borehole instrument according to the invention shown in operative position in an earth borehole;

FIG. 2 illustrates schematically a pad neutron section of the apparatus according to FIG. 1;

FIG. 3 illustrates schematically a pad acoustic section of the apparatus according to FIG. 1;

Figure 4:
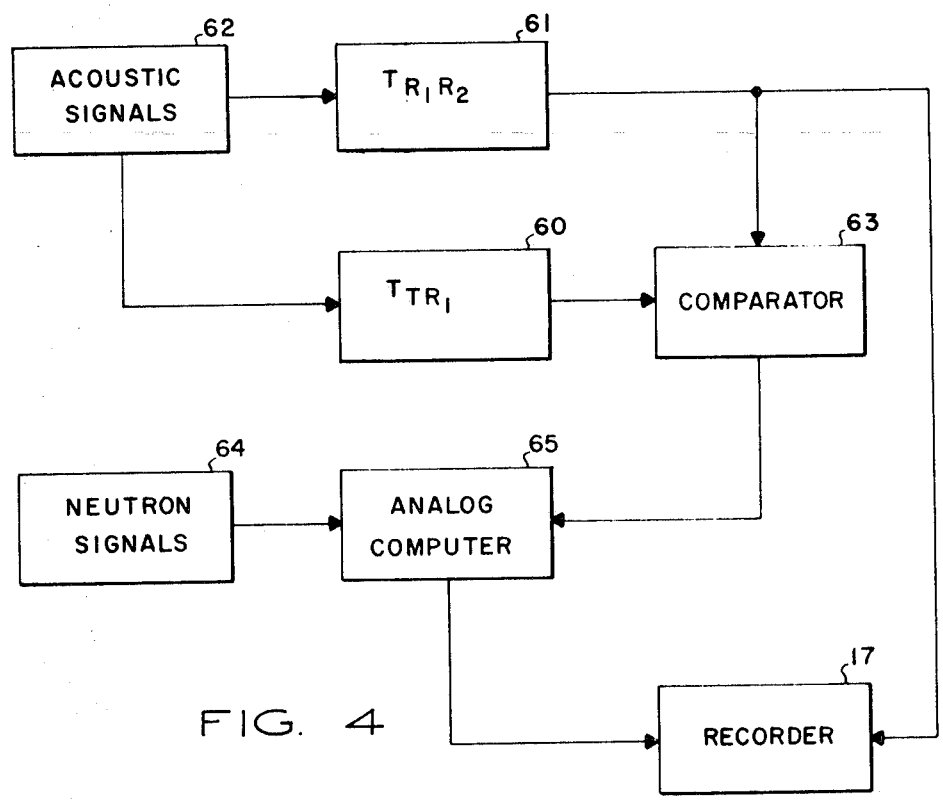
FIG. 4 illustrates in block diagram the circuitry used to compensate the neutron log for effects due to mud and mud cake according to the invention.

Referring now to the drawing in more detail, and especially to FIG. 1, there is illustrated a portion of the earth's surface 10 traversed by an earth borehole 11. A well logging instrument 12 is suspended in the borehole by a logging cable 13, the cable 13 being wound on a drum 14 at the earth's surface. The cable 13 also passes over a measuring sheave 15 to drive a transmission 16, which in turn drives the recorder 17, for example, an $x$–$y$ plotter, so that the information recorded thereon is related to depth in the borehole.

The instrument 12 has a pair of pad members 20 and 30. Pad member 20, providing a means for neutron logging and better illustrated in FIG. 2, has a neutron source 21, for example, americium-beryllium. Other neutron sources include, by way of further examples, radium-beryllium, plutonium-beryllium and californium. The pad 20 also contains a radiation detector 22, for example, a detector of epithermal neutrons such as $HE_3$ or $BF_3$. The detector 22 could also be a gamma-ray detector, for example, a Geiger counter or a scintillation counter, if it is desired to measure gamma rays resulting from neutron capture. A suitable shield 23 may be inserted between the source 21 and detector 22 to prevent direct irradiation of the detector by the source. The necessary electric conductors 24 connect the detector 22 to the main instrument housing 12. In a manner well known in the art, the pad 20 is held in contact with the borehole wall and mud cake 25 by a pair of spring members 26 and 27.

The porosity and thickness of the mud cake 25 are in general unkonwn quantities, at least to some extent. The response of the neutron logging instrument will vary with changes in the thickness and character of the layer of material between the formation and the pad. It is desirable to correct the porosity measurements obtained by the neutron pad 20 whenever such measurements are in error due to the mud or mud cake. As will be explained hereinafter, the apparatus of FIG. 3 and its associated electronics provides such a means.

In FIG. 3 there is illustrated in more detail the acoustic pad 30 which is held in contact with the borehole wall and mud cake 25 by a pair of spring members 31 and 32. The pad 30, preferably machined from a piece of steel for mechanical strength, has a cavity for mounting a transmitting transducer 33, an acoustic isolator section 34 and a pair of cavities for mounting the receiving transducers 35 and 36. The acoustic isolator section 34 between the transmitter and receivers is designed to attenuate and delay acoustic energy which would otherwise tend to travel directly through the pad. The design and operation of this acoustic pad is described in detail in the co-pending U.S. application Ser. No. 766,410, filed Oct. 10, 1968.

The transmitting transducer 33 and the receiving transducers 35 and 36 may, for example, respectively comprise 1.5 inch diameter, lead zirconate ceramic discs. In the preferred embodiment of the invention, the centers of the discs in the transducers 35 and 36 are six inches apart, but those skilled in the art will recognize that other distances provide corresponding results. The distance from transmitter 33 to receiver 35 may be, for example, eight inches.

The three transducers within the acoustic pad 30 are mounted in a fluid medium at an angle which provides optimum reinforcement of the signal transmitted through the formation and received by the receivers in accordance with the teaching of the above-mentioned co-pending patent application.

The sets of electrical conductors 44 and 45, respectively, connect the outputs from the receiving transducers 35 and 36 to the downhole electronics in the main instrument housing 12. Cable 13 can be a conventional seven conductor logging cable which provides a means for transmitting the signals from the radioactivity detector 22 (via conductor 24) illustrated in FIG. 2 and the acoustic signals from the conductors 44 and 45 illustrated in FIG. 3.

The acoustic actuating pulse from the electronics section in the main instrument housing 12 along the conductors 39 to the acoustic pad 30 and the signals from the acoustic receivers in the pad back to the electronics section in the instrument 12 are transmitted over separate coaxial cables and coaxial pressure feed-throughs in the pressure bulkhead (not illustrated) which separates the electronics section from the mechanical section.

Thus there has been described an acoustic pad section wherein an actuating pulse is applied to a piezo-electric transmitting transducer, thereby setting up an acoustic wave which is coupled to the formation through the intervening fluids; at the formation face the acoustic wave is refracted and part of the energy travels parallel to the borehole wall as a compressional wave. In turn, a portion of this wave energy is refracted toward the receivers and detected by the two receiving transducers.

Since the receivers are similar to one another and having similar mountings, the time elapsed between the wave arrival at the two receivers is independent of mud cake thickness or standoff of the pad from the borehole wall; thus, the velocity of an acoustic wave in the formation surrounding the borehole can be derived by measuring the travel time from first receiver to second receiver. In the art of acoustic well logging it is customary to record acoustic velocity in units of microseconds per foot. Thus, if the two receivers $R_1$ and $R_2$ are situated with their centers a distance $D_{R_1R_2}$ apart (measured in feet) and the measured travel time is $t_{R_1R_2}$, then the acoustic velocity is:

$$V = \frac{t_{R_1R_2}}{D_{R_1R_2}} \tag{1}$$

In practicing the present invention, the velocity V is, in general, recorded as a function of depth in the borehole as in the prior art. Additionally, it is desired to determine the extent of influence, if any, produced by the mud or mud cake. This is accomplished by comparing the travel time $t_{R_1R_2}$ with the measured travel time $t_{TR_1}$ from transmitter to first receiver. It will be appreciated that during the time interval $t_{TR_1}$, the acoustic wave travels from the face of the transmitting transducer through the intervening fluids within the instrument, then through any mud or mud cake between the instrument and the formations, then through the formation itself, then back to the instrument through the mud or mud cake, and finally to the receiver through the fluid in the instrument. Thus, $$t_{TR_1} = 2t_0 + 2t_m + t_F \tag{2}$$

where $t_0$ is the time elapsed for the acoustic wave to travel through fluids or other materials outward from the transmitter or inward toward the receiver; $t_m$ is the travel time through the mud or mud cake, if any; and $t_F$ is the time of travel through the formation. It should be apparent that $t_0$ is substantially constant for a given instrument and that $t_F$ can be continuously derived from the relation $$t_F = t_{R_1R_2} \left[ \frac{D_{TR_1}}{D_{R_1R_2}} \right] \tag{3}$$

where $D_{TR_1}$ is the effective spacing between transmitter and first receiver. In general $D_{TR_1}$ will be approximately equal to the measured distance from the center of the transmitter to the center of the first receiver. However, it should be measured experimentally in a formation of known acoustic velocity using Relation 4 derived from Equation 3

$$D_{TR_1} = \frac{t_F(D_{R_1R_2})}{t_{R_1R_2}} \tag{4}$$

From Equation 2 it may be seen that the travel time in mud or mud cake is the only unknown quantity, wherein $$t_m = \tfrac{1}{2}[t_{TR_1} - 2t_0 - t_F] \tag{5}$$

Thus the mud travel time $t_m$ may be continuously derived during the logging operation and may be recorded in correlation with depth in the borehole.

The present invention employs the parameter $t_m$ in a novel and beneficial way to improve the neutron log which may be made concurrently.

It is well known that a neutron log responds to the hydrogen contained in the minerals and fluids of the formation. Such a log also responds to the hydrogen content of the mud or mud cake between the measuring pad and the borehole wall. If the neutron pad and the acoustic pad have similar size and shape, and if they are respectively held against the wall with approximately equal spring force, then both will, on the average, experience approximately equal standoff from the borehole wall. The measured travel time $t_m$ as measured by the acoustic section is therefore a measure of the mud or mud cake between the neutron pad and the borehole wall. Thus, it may be employed to correct the neutron measurement whenever mud or mud cake is detected.

Figure 5:
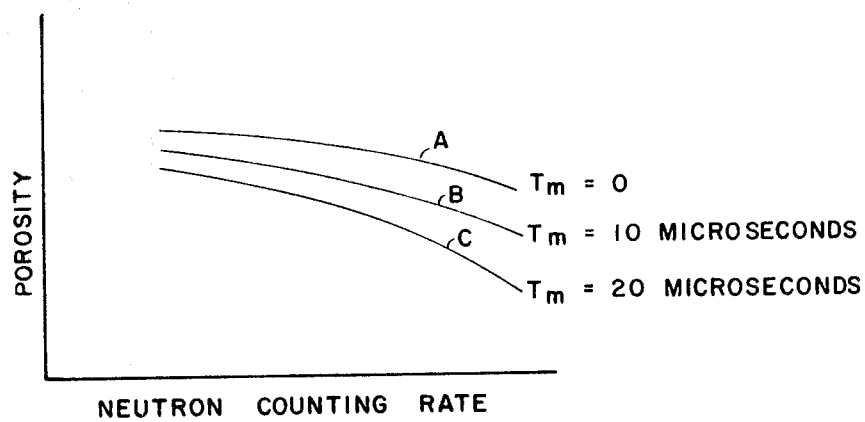
FIG. 5 illustrates a family of correction curves for exemplary mud cakes encountered in well logging.

FIG. 5 shows the manner in which the measured value of $t_m$ is employed to improve the neutron porosity measurement. Curve A represents a conventional neutron response curve which relates formation porosity to the observed counting rate of the detector. Such curves are determined experimentally or mathematically for each type of logging instrument, and if required, separate curves are determined for various types of rock and various borehole conditions. In accordance with the present invention, for each such response curve an additional set of curves is determined for varying amounts of instrument standoff. As illustrated in FIG. 5, curve B is a typical response curve obtained when the measuring neutron pad is held away from the borehole wall such a distance that $t_m$ is 10 microseconds. Curve C similarly represents the neutron porosity response when $t_m$ is 20 microseconds. If the material is water, of course, 10 microseconds represents a standoff distance of about 0.6 inch. For mud or mud cake as compared with water, the acoustic travel time is less due to their solids content. Because the acoustic travel time $t_m$ is approximately proportional to the "porosity," that is, the water content of the mud, it may be seen that $t_m$ varies in proportion to the required neutron correction. Thus, it is not necessary to determine whether the standoff is due to mud cake on the one hand or wall roughness on the other since $t_m$ is inherently sensitive to the amount of water in the space between the instrument and the borehole wall and gives, therefore, a direct indication of the magnitude of the required correction.

Accordingly this invention makes it possible to derive a corrected porosity from the neutron log even in boreholes that have rough walls or thick mud cakes. As will be explained in more detail hereinafter, FIG. 4 is a block diagram of a system embodying the invention.

Referring again to FIG. 1, a portion of the surface electronics section 48 provides a means for operating upon the voltages indicative of the acoustic signals. For example, the electronics section 48 and downhole electronics in the main instrument housing 12 could correspond, if desired, to that disclosed in U.S. Pat. No. 3,019,413 to Adrian P. Brokaw, issued on Jan. 15, 1959, and assigned to the assignee of the present invention.

As set forth above, the output from the pad acoustic section of the apparatus embodied herein is used to compensate the neutron log for the mud or mud cake encountered. The means for accomplishing such compensation are illustrated in block diagram in FIG. 4, wherein a portion of the surface electronics 48 measures the time interval between the acoustic transmitter (T) and the first acoustic receiver ($R_1$). Also measured is the time interval between the first receiver ($R_1$) and the second receiver ($R_2$). As mentioned above, such interval measurements are conventional and can be accomplished, for example, with the system disclosed in the above-identified patent to Brokaw. The voltage outputs representative of $t_{R_1R_2}$ and $t_{TR_1}$, respectively, are connected into a comparator circuit, for example, as disclosed in the co-pending application of Francis J. Niven, Jr., Ser. No. 684,849, filed Nov. 21, 1967, especially FIG. 5 therein, wherein one of the voltages is inverted if need be.

Referring further to FIG. 4, the box 64 comprises conventional neutron well logging circuitry which provides a voltage indicative of a porosity measurement from the neutron pad 20. The voltage is coupled into the analog computer circuit 65. Such a circuit modifies the output voltage from the box 64, and can be constructed, for example, similarly to FIG. 4 of the above-identified co-pending Niven application.

The output of the analog computer circuit 65 is coupled into the recorder 17, as is the interval time measurement from the circuit 61.

The box 62 comprises conventional acoustic logging circuitry which couples the electric signals representative of the received acoustic signals into the two channels indicated as boxes 60 and 61, being indicative of $t_{R_1R_2}$ and $t_{TR_1}$, respectively. The two channels are coupled into the comparator circuit 63, the output of which is connected into the analog computer 65. The signals from the circuitry 61 are also coupled directly into the recorder 17 so an indication of formation velocity can be recorded concurrently with the compensated porosity measurements.

In the operation of the circuitry illustrated in block diagram in FIG. 4, the outputs from circuit 60 and 61 (normalized) are compared. If the compared voltages from circuits 60 and 61 are substantially alike, there is provided an indication of negligible mud cake, and the output from the comparator is zero, or alternatively, can be nulled out in a conventional manner. If the voltage from the circuit 60 is larger (after normalization), being thus indicative of a longer travel time, the excess voltage is a direct indication of standoff. Thus, the output from the comparator circuit 63 will be a voltage indicative of the amount of correction required. The output from comparator 63 is then coupled into the analog computer circuit 65, along with the voltage from the circuit 64. Since mud and mud cake are normally high in water content, compared to the surrounding formations, the mud cake compensation provided by the acoustic signals serves to lower the apparent porosity value, and the compensated porosity values are then coupled into the recorder.

While the preferred embodiments of the invention have been described herein, those skilled in the art will recognize that modifications and alterations of these embodiments will become apparent after a careful reading of the specification and accompanying drawings. For example, while the preferred embodiment contemplates that the neutron pad and the acoustic pad be on opposite sides of the borehole, and substantially on the same lateral plane, they may instead be in a trailing relationship, one above the other, with the signal from the upper being memorized and delayed in a conventional manner to bring the two measurements into depth synchronism. Therefore, it is intended that such modifications and alterations of the embodiments described herein as come within the scope of the invention be covered by the appended claims.

The embodiments of the invention in which an exclusive property or privilege is claimed are defined as follows:

1. A well logging apparatus for investigating characteristics of formations surrounding an earth borehole, comprising:

a borehole instrument adapted to traverse said borehole, said instrument having an acoustic pad member having an electrical output and a radioactivity pad member having an electrical output mounted thereon, each of said pad members having means for causing said members to contact the borehole wall during such a traversal; and means responsive to the electrical output of said acoustic pad member to compensate the electrical output of said radioactivity pad for stand-off between the borehole instrument and the formations surrounding the borehole due to mud cake or wall roughness.

2. The apparatus according to claim 1 including in addition thereto means for recording said compensated electrical output as a function of depth within the borehole.

3. The apparatus according to claim 2 wherein said acuostic pad member includes at least one transmitting acoustic transducer and at least two receiving acoustic transducers.

4. The apparatus according to claim 3 wherein said means responsive to the electrical output of the acoustic pad member includes means for comparing the acoustic travel time between said transmitting transducer and the first of said receiving transducers to the acoustic travel time between said two receiving transducers and means for using the output of said comparison means to compensate said radioactivity electrical output.

5. A method of logging the characteristics of formations surrounding an earth borehole, comprising:

(a) irradiating the formation with neutrons;

(b) detecting radiation in said formations resulting from said irradiation and producing a first electrical signal functionally related to said detected radiation;

(c) transmitting an acoustic wave from a transmitter into said formation;

(d) comparing the transit time of said wave between the transmitter and one acoustic receiver with the transit time of said wave between a pair of acoustic receivers and producing a second electrical signal functionally related to said comparison and indicative of the standoff between the borehole instrument and the formations surrounding the borehole while said formations are being irradiated with neutrons; and (e) compensating said first electrical signal as a function of said second electrical signal.

6. The method according the claim 5 including the additional step of recording said compensated first electrical signal as a function of depth within the borehole.

References Cited

UNITED STATES PATENTS 3,175,639   3/1965   Liben   73—152UX
3,233,105   2/1966   Youmans   73—152X JERRY W. MYRACLE, Primary Examiner U.S. Cl. X.R.

250—83.6; 340—15